United States Patent [19]
Heller et al.

[11] Patent Number: 5,276,496
[45] Date of Patent: Jan. 4, 1994

[54] OPTICAL RECEIVER FOR AREA LOCATION SYSTEM

[75] Inventors: Alan C. Heller; Albert C. McNamara, Jr., both of San Antonio, Tex.

[73] Assignee: Precision Tracking FM, Inc., San Antonio, Tex.

[21] Appl. No.: 969,753

[22] Filed: Oct. 30, 1992

[51] Int. Cl.⁵ .................... G01B 11/26; G01C 1/00; G01J 1/20
[52] U.S. Cl. .................. 356/141; 250/203.3; 250/206.1; 250/342; 356/152
[58] Field of Search ............ 356/141, 152, 4; 358/109; 342/52; 250/201, 206.1, 216, 342, 353, 561, 203.3

[56] References Cited

U.S. PATENT DOCUMENTS

| | | | |
|---|---|---|---|
| 4,193,689 | 3/1980 | Reymond et al. | 356/152 |
| 4,806,747 | 2/1989 | Dunavan et al. | 250/203 |
| 5,047,776 | 9/1991 | Baller | 342/52 |
| 5,076,687 | 12/1991 | Adelson | 356/4 |

Primary Examiner—Stephen C. Buczinski
Attorney, Agent, or Firm—Baker & Botts

[57] ABSTRACT

An optical receiver for use with an optical location system that locates a target in a defined area. A spherical lens is placed over the area. The area is divided into sections, with a sensor associated with each section. These sensors receive light transmitted through the lens, and are positioned relative to each other and with respect to the lens, such that each sensor receives emitted light from the same size section if the target is located in its section. The height of each sensor may be adjusted so that each sensor receives light of the same intensity if the target is located in its section.

22 Claims, 5 Drawing Sheets

OPTICAL RECEIVER FOR AREA LOCATION SYSTEM

TECHNICAL FIELD OF THE INVENTION

This invention relates to position location systems using optical transmitters and receivers, and more particularly to an optical receiving unit for such systems.

BACKGROUND OF THE INVENTION

Optical location systems are increasingly being used to locate mobile items in a defined area. An example of an application is locating light emitting product items during their movement from one workstation to another in a manufacturing plant.

Typical optical location systems involve at least one object, i.e., target, that moves within an area whose perimeter is defined by the range of the transmitters and receivers. In some systems, the target carries the transmitter and the receiver is stationary; in others, the target receives a transmitted signal. In a third type of system, the target reflects transmitted radio or light waves back to a receiver.

An advantage of placing the transmitting device on the target is that the transmitted signal may then contain data identifying the target. Optical location systems using a transmitter attached to the target are described in U.S. Pat. No. 4,710,028 to Grenier, et al, and in U.S. Pat. No. 3,614,240 to Brandts, et al. These systems use a matrix of photosensitive elements, and the coordinate position of a sensitized element is used to determine the position of the target.

Typically, the signals used in optical location systems are infrared and suffer from high background noise due to ambient light, such as daylight, incandescent, and fluorescent light. Because of this, many systems are required to operate in dark or low light conditions. However, this is impractical for many applications, such as tracking locations of items in a manufacturing plant.

A need exists for an optical location system that has decreased sensitivity to noise resulting from ambient light. However, such a system should not be prohibitively expensive in terms of its optical and electro-optical devices.

SUMMARY OF THE INVENTION

One aspect of the invention is an optical receiving unit for an optical location system, which locates a light emitting target in a defined area divided into sections. The receiver has a spherical lens made from a transparent material, which has a front side for receiving light from an area in which a target is to be located and a back side for emanating said light to a number of sensors. A number of point sensors are spaced from the back side of the lens. The number of sensors corresponds to the number of sections of the location area, and the sensors are arranged behind said lens such that each sensor has a position relative to other sensors and a distance from the lens that is determined by its distance from its corresponding section. For a location area having equally sized sections, the sensors corresponding to farther away sections are spaced farther apart from each other and closer to said lens that are sensors corresponding to closer sections. The height of each sensor can be adjusted so that each sections receives the same light intensity if the target is located in its section.

A technical advantage of the invention is that it provides a compact receiving unit for an optical location system that minimizes noise sensitivity. A single spherical lens used with multiple sensors avoids the need for multiple lenses. The lens provides substantial gain, which permits the sensors to be small. Strategic placement of the sensors behind the lens permits adjustment of the field of view and sensitivity of each sensor so that the effects of a perspective view of the location area can be compensated.

DETAILED DESCRIPTION OF THE INVENTION

Figure 1:
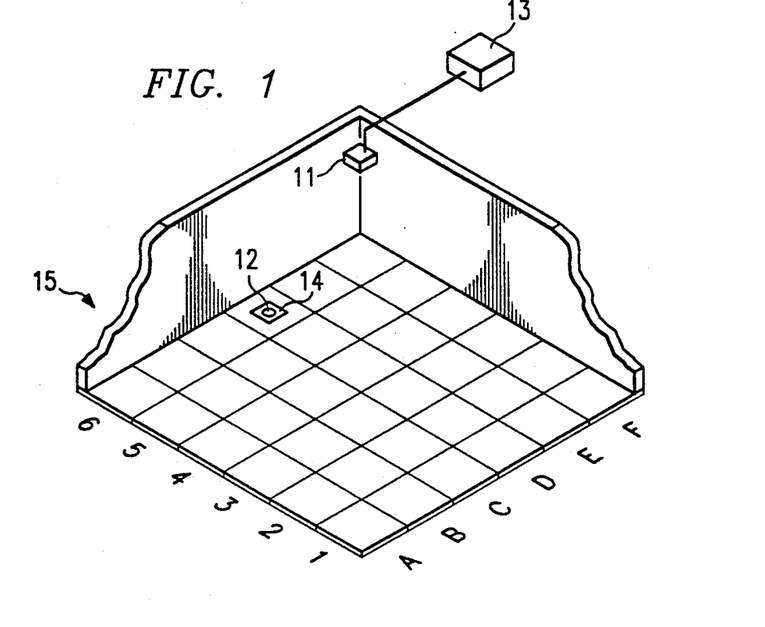
FIG. 1 illustrates the optical location system, a target, and an area in which the target is to be located.

FIG. 1 illustrates an optical location system, comprised essentially of a receiver 11 and transmitter 12 and processing station 13, which are used to locate a target 14, to which transmitter 12 is attached. Target 14 moves within a defined location area 15. As will be clear from the following description, the sizes of receiver 11 and transmitter 12 are greatly exaggerated relative to the size of area 15.

An example of an application of the location system is locating a work piece in a manufacturing plant. The target 14 is the work piece, such as a printed circuit board, which travels from one production station to another during the manufacturing process.

The system of FIG. 1 is a two dimensional location system, in the sense that the location of target 14 is determined in terms of x and y coordinates of a plane parallel to the floor of area 15. In the example of this description, area 15 is conceptualized as a grid of 36 sections, which in the example of FIG. 1 are identified by a letter A-F and an integer 1-6. Target 14 is shown in section (D,6).

Transmitter 12 is attached to target 14. Each transmitter 12 transmits an omni-directional or near omni-directional optical signal at selected intervals. The signal typically includes an identifier so that if there is more than one target 14, it may be distinguished from other targets 14. In the preferred embodiment, transmitter 12 is an infrared source, which emits pulses representing digital information. However, transmitter 12 may also emit visible light or other radiation. Various devices for providing such an optical signal are known in the art of electro-optical devices.

Receiver is a spherical lens and an array of optical sensors behind it. As explained below, each of these sensors is associated with one of the 36 sections of area 15. The lens directs emitted light to a sensor so that the position of the target may be determined by identifying the sensor that detects the light.

Processing station 13 receives the output from receiver 11, which in its simplest form is a signal representing that a certain sensor of receiver 11 has detected incoming light from transmitter 12. In more complicated systems, a sequence of signals may be decoded to identify the particular target 14 being located. Processing station 13 accumulates data pertaining to each target 14 and its movement. The data that may be supplied to processing station 13 and its operation are described in U.S. Pat. No. 5,119,104, entitled "Location System Adapted for Use in Multipath Environments", to Heller.

In this description, it is assumed that receiver 11 is placed over the midpoint of area 15. However, other locations could be used, with the spacing and distances adjusted in accordance with the concepts described below.

Figure 2:
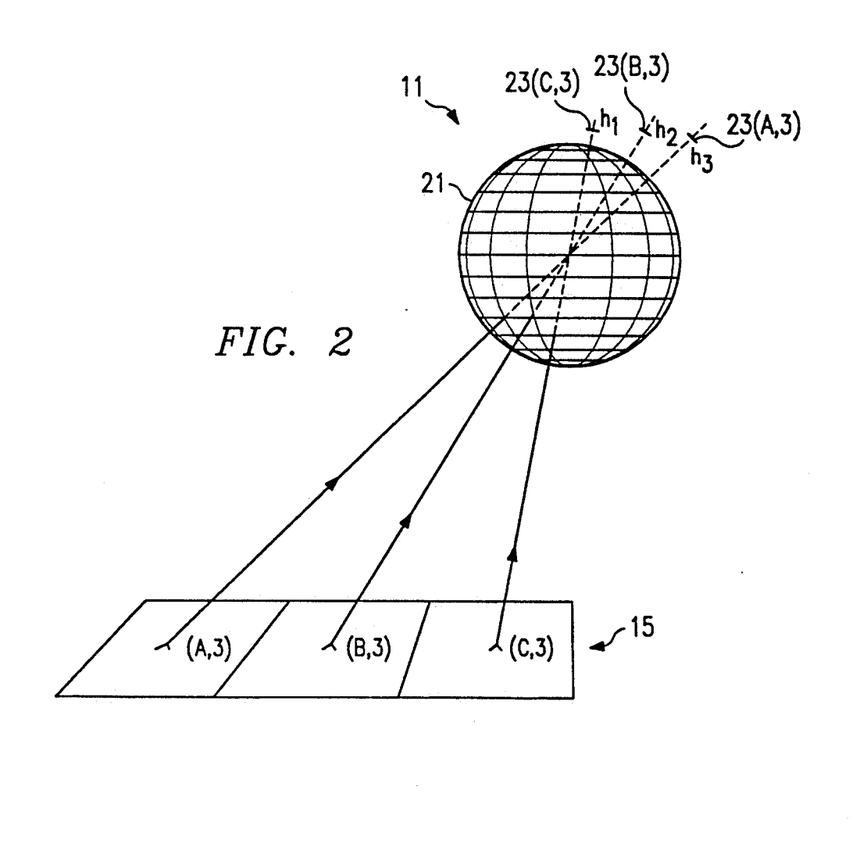
FIG. 2 illustrates the receiver of FIG. 1, and a ray traced from a point in each of several sections of the location area.

FIG. 2 illustrates the spherical lens 21 of receiver 11 and three of its sensors 23. As indicated, lens 21 has a front side, which receives light from area 15, and a back side, from which this light emanates to sensors 23.

Lens 21 is transparent, made from a plastic material such as acrylic. A feature of the invention is that many image qualities important to other optical systems are not important. Thus, the qualities of plastic that make it less than ideal for image applications, are immaterial to the invention. For example, color variations and resolution problem do not affect the energy gathering function of lens 21 if made from plastic.

FIG. 2 also shows a single ray from a single point in each of three sections of area 15; a more complete illustration would have rays from a number of points in each section and would show such rays for each section of area 15. However, for simplicity of explanation, only one ray from the midpoint of sections (A,3), (B,3), and (C,3) is shown.

Sensors 23 are conventional photosensitive devices, such as photodiodes. Typically, transmitter 12 is an infrared transmitter, thus sensors 23 detect infrared signals. Sensors 23 may be opto-electric devices that convert an optical input into an electrical signal for communication to processor 13. Or, sensors 23 may simply receive and communicate an optical signal, which is delivered to a transducer (not shown) for conversion to a signal that can be input to processor 13.

Sensors 23 are behind lens 21 with respect to receiver 11, and receive light transmitted through lens 21. There is a one-to-one relationship between sensors 23 and sections of area 15. For purposes of this description, the axis between a selected point in a section and its corresponding sensor 23 is referred to as the "section/sensor axis".

As will be explained below, sensors 23 are arranged in a three dimensional pattern behind lens 21. Although all sensors 23 are behind lens 21 with respect to area 15, they are not at the same distance, h, above lens 21. The value of h depends on the distance of the sensor 23 from its section. The spacing between any two sensors 23 also depends on the distance of each from its section.

Figure 3:
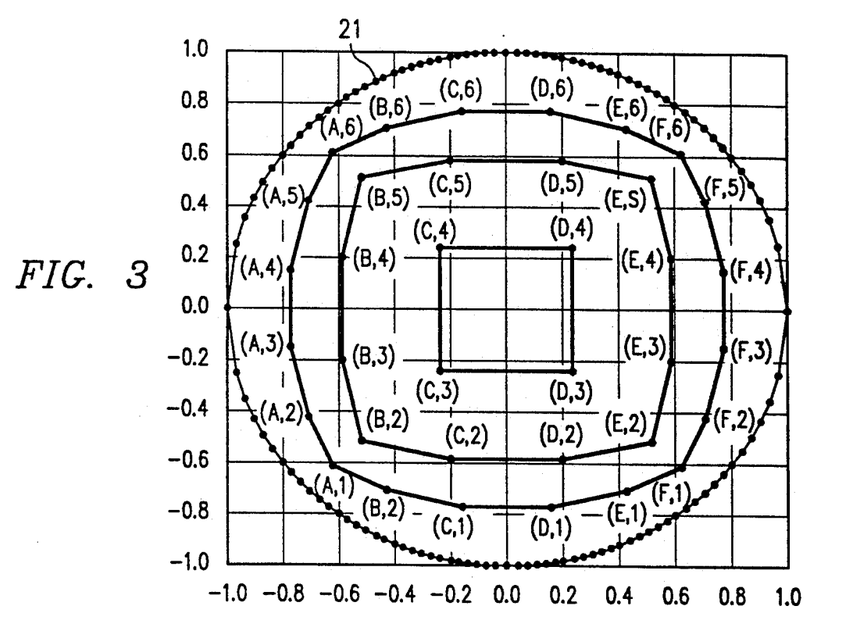
FIG. 3 is a top view of the spherical lens, showing sensors placed in a pattern in accordance with the invention.

FIG. 3 is a plan view of the back side of spherical lens 21 and the sensors 23 above its surface. There are 36 sensors 23, one for each section of area 15. Each sensor 23 is labeled in terms of its associated section, i.e., the sensor 23 associated with section (B,3) is labelled (B,3).

In the example of this description, sensors 23 are arranged in three nearly circular rings. An inner ring has four sensors 23, an intermediate ring has twelve sensors 23, and an outer ring has twenty sensors 23. This pattern is related to the shape of area 15, which is a 6×6 square of sections. The scale of FIG. 3 indicates the relative position of each sensor 23 for a lens 21 that is one unit in radius.

FIG. 3 maps each sensor 23 to its corresponding section of area 15, i.e., sensor 23(C,3) detects light from section (C,3). The inner ring of four sensors 23 corresponds to the inner square of sections, i.e., sections (C,3), (D,3), (C,4), and (D,4). The intermediate ring of twelve sensors 23 corresponds to sections (B,2)–(E,2), (E,3), (E,4), (E,5)–(B,5), (B,4) and (B,3). The outer ring of twenty sensors 23 corresponds to the outer sections of area 15.

As explained below, the three rings of sensors 23 are not equally spaced from each other. This spacing inversely corresponds to the distance of the sensors 23 in the ring to their associated sections. In other words, the rings are closer together as the distances of sensors 23 from their sections become greater. For example, because the sensors 23 of the inner ring are closer to their sections than are the sensors 23 of the outer ring, the spacing between the inner ring and the intermediate ring is greater than the spacing between the intermediate ring and the outer ring.

Figure 4:
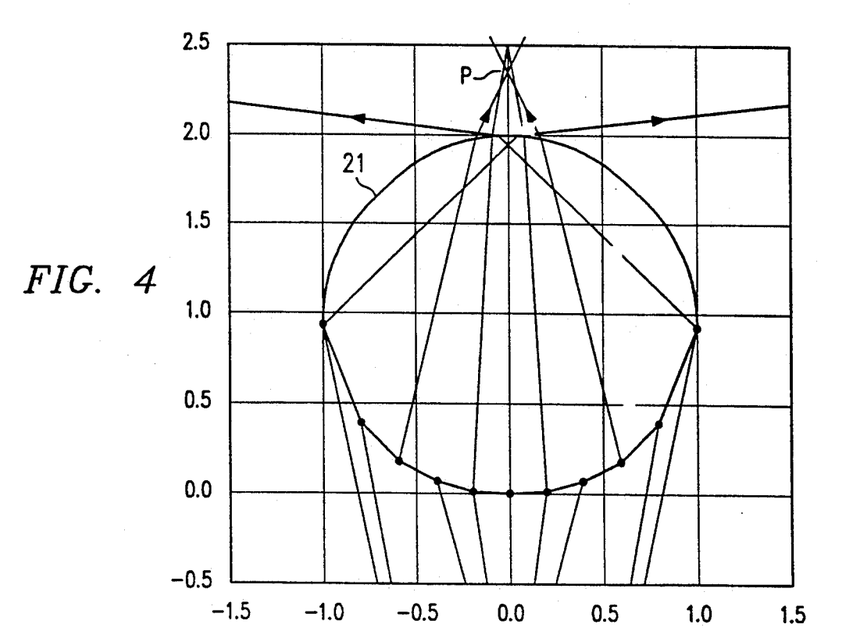
FIG. 4 is a cross sectional view of the spherical lens showing convergence of rays from a point in one of the sections of the location area.

FIG. 4 is another cross sectional view of lens 21, and in contrast to FIG. 2, shows a number of rays from a single point in one section. It illustrates how the rays from a point of any one section of area 15 form a "convergence cone" of light intensity behind lens 21. The rays incident at the front side of lens 21 converge toward the back of lens 21. After exiting lens 21, most rays converge to almost a point, P, referred to herein as the convergence point. Due to spherical aberration, not all light converges, so that each convergence point receives approximately 80% of the total light from its section. However, this loss does not affect the operation of the invention.

The location of convergence cones from points of an area is of known dimensions, for a lens 21 of a given size, can be calculated using known optical techniques. As explained below, for an area 15 that is divided into sections, these calculations are used to determine parameters such as the size of lens 21, its location over area 15, the size of sensors 23, and where to place the sensor 23 associated with each section.

FIG. 4 also suggests, in two dimensions, how ray tracing can be used to locate a sensor 23 that will receive light from all points in a section of area 15. A single convergence cone of light from a section's midpoint could be calculated such that it is known to receive light from all points. For enhanced accuracy, rays may be traced from two or more points, resulting in overlapping convergence cones. For each section, a sensor 23 placed so that it receives light from all cones. The size of the sensor 23 will determine the height, h, it must be to intersect at least part of all cones. If the cones overlap, a sensor 23 placed in this area of overlap may be very small and will receive light from both points. By carefully selecting points from which rays are traced, a location can be determined that will receive light from all points in a section with a minimum of light from adjacent sections. For example, for a square section that is n×n feet, rays traced from four points, each located at a corner of an inner square, n/2×n/2 feet, centered at the middle of the section, should result in four convergence cones. A sensor 23 that intersects all four cones will receive light from each point. The extent to which the cones overlap can be controlled to minimize light received from adjacent sections.

Thus, a location for any sensor 23 with respect to lens 21 may be determined by means of ray tracing from at least one point in its corresponding section. The sensor 23 may be located at any height, h, so long as it receives light from both cones. However, as explained below, a particular height, h, can be determined such that each sensor 23 will receive not only light from different points in its section but light of the same intensity as that received by any other sensor 23.

An advantage of the invention is that lens 21 provides a substantial amount of gain, depending on its size. This helps to avoid problems with ambient noise and permits the use of relatively small sensors. A typical lens 21 is 2 inches in diameter, with sensors 23 having a 0.1 inch square detection area. As will be explained below, the sensor size and location, the lens size and location, and the section size and location, are all parameters that can be adjusted to match the field of view of each sensor 23.

Figure 5:
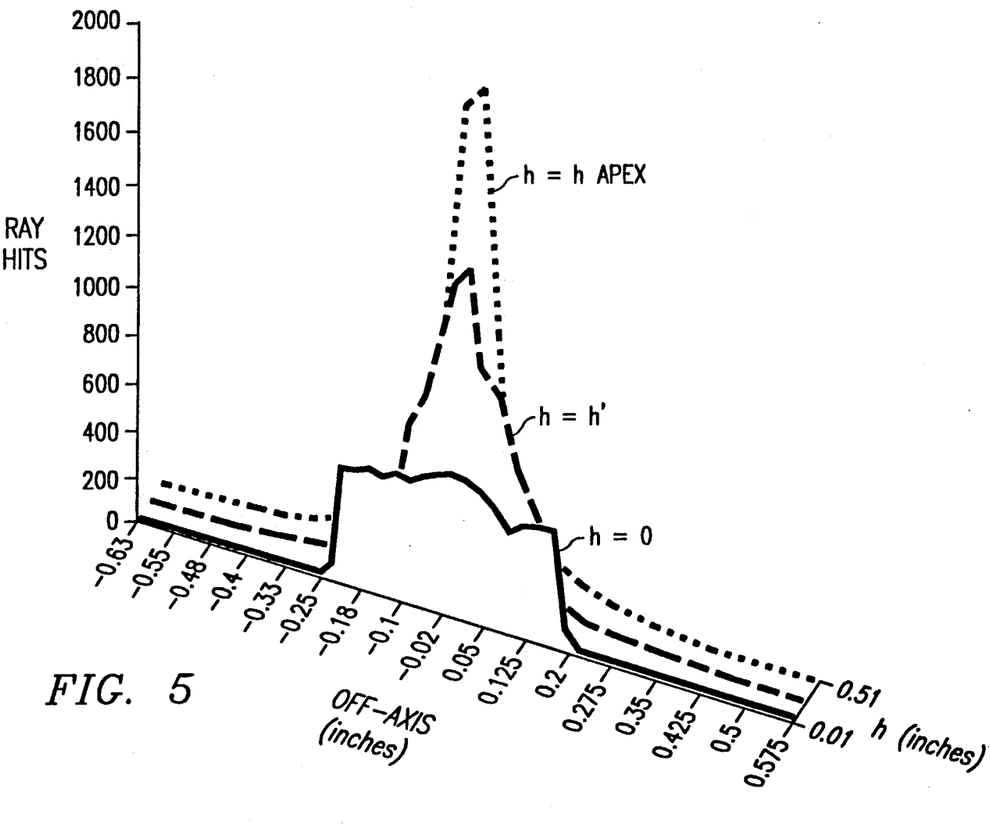
FIG. 5 illustrates the relationship between the location of a sensor with respect to a convergence cone axis and the intensity of light received by the sensor.

FIG. 5 illustrates, for a given transmitter location, how the height of a sensor 23 above lens 21 affects the number of rays it receives from the emitting point as well as from "off-axis" points. It is assumed that 2000 rays were traced from a single emitting point in area 15, through the center of lens 21 to a sensor 23, resulting in a convergence cone having a section/sensor axis as in FIG. 2. The "off-axis" dimension represents a distance in inches from this axis to a "cone axis" that would be formed by convergence cones of light from other points near the emitting point. Unless stated otherwise, for purposes of FIG. 5, it is assumed that sensor 23 is a "point" sensor, in the sense that its receiving area is very small.

As the distance, h, from lens 21 along the section/sensor axis 23 increases, so does the number of ray hits. Hence, at a height, $h_{apex}$, which is at the apex of the on-axis convergence cone, the intensity of light received by that sensor 23 is a large value. However, at that height, $h_{apex}$, the field of view is narrow in the sense that if sensor 23 is shifted very much to the right or left, off the axis of the cone, it would not receive any light. On the other hand, sensors 23 near lens 21 have wider fields of view in the sense that they receive more light from off-axis convergence cones. However, these closer sensors 23 receive less intense light.

From FIG. 5, it can be seen that if an on-axis "point" sensor 23 were placed above lens 21 at a height, $h_{apex}$, it would receive intense light from the emitting point. In other words, it is "hit" by nearly all rays striking lens 21. However, if it is shifted to the right or left, it would not receive any light. On the other hand, by either increasing the size of the sensor 23 or moving it closer to the surface of the lens, its off-axis field of view can be increased.

To receive light from multiple points, a sensor 23 of a given size must have a height within a given range, h=0 to h=$h_{max}$. For example, if ray hits for a second point, at a certain distance from the first, were calculated to obtain a second $h_{apex}$ at an off-axis distance of 0.2 inches, a sensor 23 at that h=$h_{apex}$ must be approximately 0.2 inches wide in order to receive light from both points. Sensor 23 could be smaller if placed closer to lens 21. Sensor 23 could also be smaller if the distance between the first and second points were decreased, resulting in a smaller off-axis distance.

Figure 6:
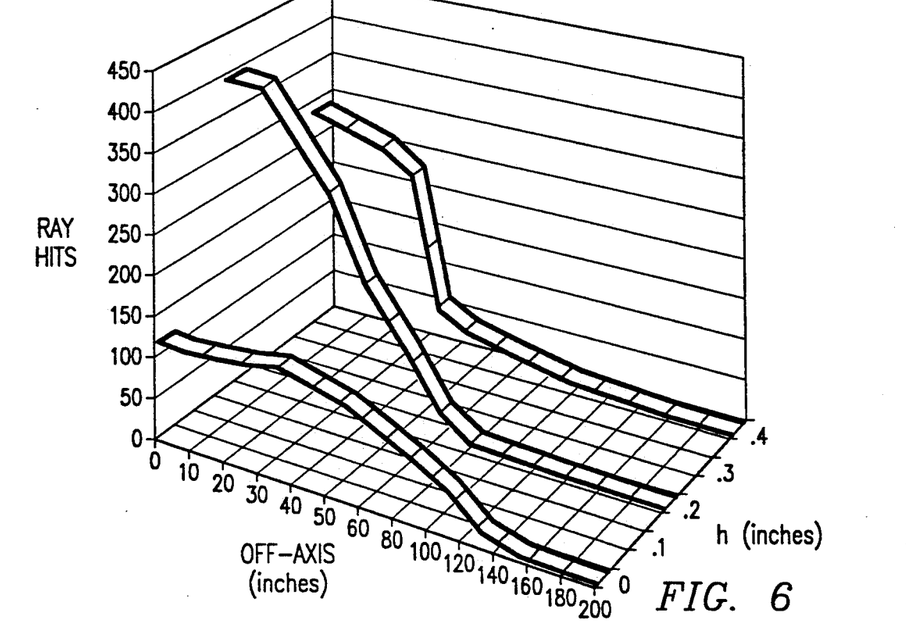
FIGS. 6-8 illustrates the relationship between the location of a sensor with respect to a section-to-lens axis and the intensity of light received.
Figure 7:
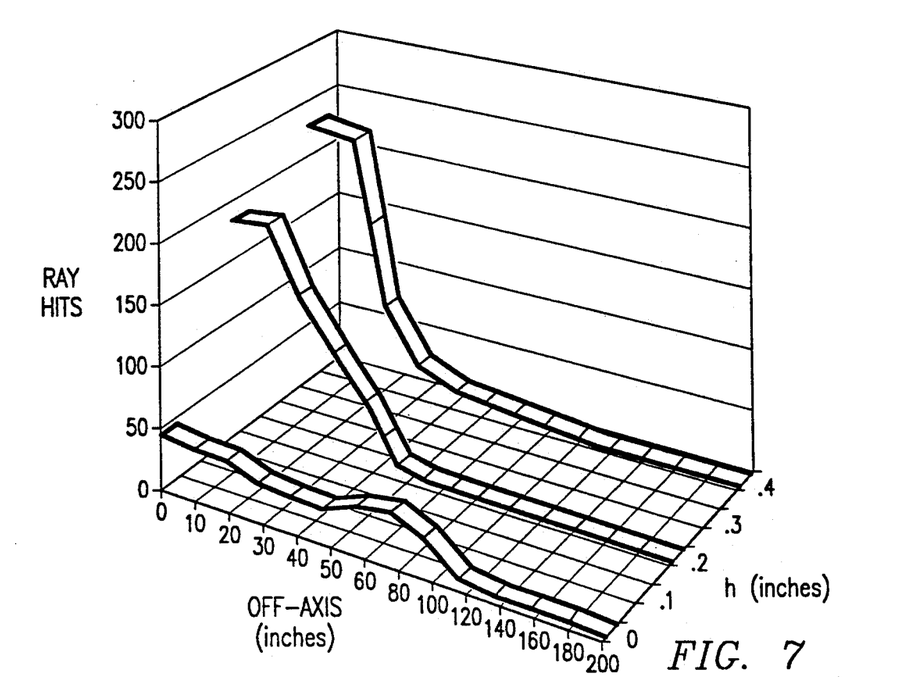

FIGS. 6 and 7 illustrate the effect of varying the size of sensor 23. FIGS. 6 and 7 are similar to FIG. 5, except that the "off-axis" dimension represents the distance off-axis of a point in area 15 from the point at the end of the section/sensor axis. Again, h represents the height of the on-axis sensor 23. The ray hits decrease as the convergence cones of light from off-axis points intersect less and less of the sensor 23.

In FIG. 6, the sensor 23 has a half-width of 0.15 inch; in FIG. 7, this half-width is decreased to 0.05 inch. Thus, sensor 23 is either 0.3 or 0.1 inches square or in diameter. The radius of lens 21 is assumed to be 1 inch.

Comparison of FIGS. 6 and 7 illustrates how increasing the size of sensor 23 increases its off-axis field of view. Also, as the sensor size increases, the variation of its field of view as a function of its height is less dramatic. For example, a sensor 23 having a half-width of 0.25 inch would have approximately the same field of view regardless of its height. However, an advantage of the invention is that very small sensors 23 may be used.

Figure 8:
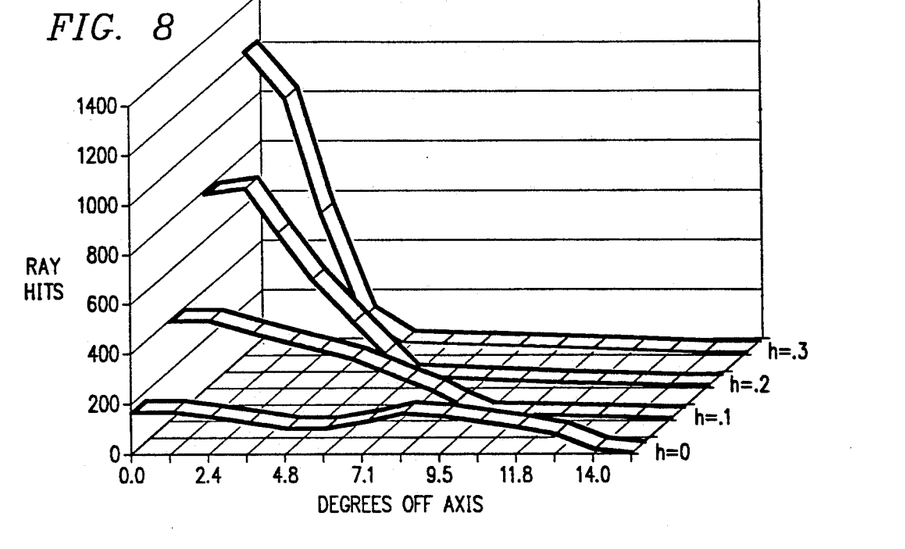

FIG. 8 is similar to FIGS. 6 and 7, except that the "off-axis" dimension is scaled in degrees so that it is not dependent on sections having a particular size or distance from lens 21. In FIG. 8, a sensor 23 having a size of 0.1×0.1 inch is assumed. As an example of determining an appropriate height and position of a sensor 23, the area 15 of FIG. 1 is assumed having square sections whose sides are ⅛ the height of receiver 11 over area 15. Receiver 11 is over the center of area 15. For section (D,4), which has one corner directly under receiver 11, the range of angles to lens 21 is 0 degrees to approximately 25 degrees. Thus, the off-axis range of a sensor 23 whose section/sensor axis is to the center of (D,4) must be approximately 12.5 degrees. To accommodate this off-axis range, the sensor 23 for section (D,4) should be located at h=0. For section (E,5), the range of angles to lens 21 is approximately 25 degrees to 43 degrees, a difference of approximately 18 degrees. This requires an off-axis value of at least 9 degrees. The corresponding sensor height for a sensor 23 whose section/sensor axis is to the center of (E,5) is h=0.1 or less. If it is placed exactly at h=0.1, the average intensity of light received will be the same as that received by a sensor for (D,4) placed at h=0. The off-axis range of angles, and the corresponding range of possible sensor heights for each section can be similarly calculated.

A further aspect of the invention is providing receiver 11 with an "isometric view" of area 15, in terms of detected light intensity. To this end, a section that is distant from lens 21, such as section (A,3), requires more light to be converged to its sensor 23 than does a closer section. This is accomplished by placing sensor 23 closer to its convergence point P, i.e., at a greater distance h from lens 21.

Figures 9, 10:
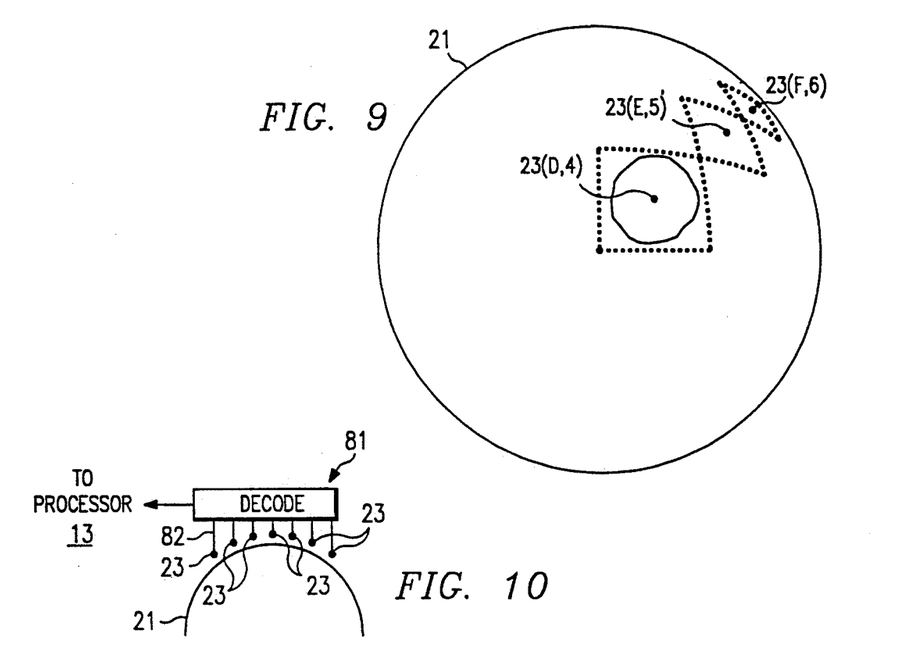
FIG. 9 illustrates the relationship between the spacing of the sensors and their field of view.
FIG. 10 illustrates a housing for the receiver of FIG. 2.

FIG. 9, together with FIG. 3, illustrates how the different fields of view of sensors 23 having different distances, h, behind lens 21 can be matched to the perspective view of lens 21. FIG. 9 shows the perspective view of three sensors 23(D,4), 23(E,5) and 23(F,6) to their sections. The farther away sections appear smaller, and thus do not require as large a field of view as closer sections. To compensate for their distance from lens 21, sections that are farther away have sensors 23 with smaller fields of view but spaced more closely together.

Thus, the spacing of sensors 23 from each other, as well as the height of each sensor 23 behind lens 21, are related to the distance of that sensor's corresponding section of area 15 from receiver 11. These parameters can be selected so that each sensor 23 "sees" approximately the same intensity from equally sized sections of area 15. The ray tracing techniques described herein need not be manually performed; computer programs can be developed to determine convergence locations for a spherical lens, given appropriate input data.

The above-described concepts can be combined to determine the location and size of each sensor 23, as well as the relative positions of sensors 23. Referring again to FIG. 2, sensor 23(A,3) detects light transmitted by transmitter 12 when target 14 is in any part of that section (A,3). Each sensor 23 is placed in a location that is determined by tracing convergence cones of rays from at least one point in the section to determine its location. The result is an array pattern such as that of FIG. 3. For a given sensor size, a maximum height, h, is also determined. Assuming that receiver 11 is placed above the center of area 15, sensors 23(C,3), 23(C,4), 23(D,3), and 23(D,4) are closer to their corresponding sections than are any other sensor 23 to their corresponding sections. These sensors 23 are farther away from their convergence points, P, and closer to lens 21, than are sensors 23 that correspond to farther away sections. Sensors 23 that correspond to farther away sections and are therefore closer to their convergence points, have a narrower field of view, which is why those same sensors 23 are closer together. The result is that each sensor 23 receives light from a maximum area of its section with a minimum of light received from any other section. If it is desired that all sensors 23 receive the same intensity of light, the values of h are adjusted accordingly.

From the foregoing discussion, a method of constructing a receiver 11 involves selecting an area 15 and choosing dimensions for each section. A lens 21 is chosen to have a size and location that will view all sections. To locate a sensor 23 for each section, rays are traced from at least one point in each section. A sensor location is determined behind lens 21, at a height within a certain range, where the sensor 23 will receive light from a maximum area of the section and a minimum of light from other sections. In this manner, each sensor 23 is located so that if transmitter 13 is anywhere in area 15, at least one sensor 23 will detect its emitted light. If desired, a unique height above lens 21 is determined for each sensor 23, such that it will receive light of a certain desired intensity.

Because the sections of area 15 are square, and the areas of detection tend to be circular, there may be some overlap between areas of detection from adjacent sections. Appropriate algorithms can be devised to reduce ambiguity resulting from this overlap.

For areas having other shapes and sections than area 15, sensor patterns different from that of FIG. 2 would be used. However, the same general concept applies in that ray tracing can be used to relate the size and location of sections to the size and location of sensors 23. For sections of equal size, sensors 23 associated with sections that are farther away from lens 21 would have narrower fields of view and would be more densely spaced than sensors 23 associated with closer sections. On the other hand, for an area having unequally sized sections, if sections that are farther away from lens 21 are larger than sections that are closer, the spacing between sensors 23 might be made the same.

FIG. 10 illustrates a housing 81 for positioning sensors 23 above lens 21. Connectors 82, one associated with each sensor 23 are contained within housing 81. Each connector 82 extends from housing 81 a predetermined distance above lens 21, such that each sensor 23 is at a predetermined height, h. A sensor 23 is placed at the end of each tube 82, such that the signal generated when light is detected travels through connector 82 to processing station 13. If sensors 23 are photoelectric devices, connectors 82 transmit their electrical output to a decoder in housing 81 an appropriate signal identifying the sensor 23 is communicated to processor 13. Connectors 82 could also be light tubes for communicating an optical output to an appropriate transducer. In this case, each sensor 23 would be a simple light receiver, perhaps with an amplification means.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An optical receiving unit for an optical location system, which locates a radiation emitting target in a defined area divided into sections, comprising:
   a lens in the general shape of a sphere made from a transparent material, having a front side for receiving radiation and a back side for emanating said radiation to a number of sensors; and
   a number of sensors spaced from said back side of said lens, wherein each sensor is associated with at least one section of said area; and
   wherein said sensors are arranged behind said lens with variable spacing between them, such that each sensor has a position relative to other sensors that is determined by its distance from its associated section.

2. The receiving unit of claim 1, wherein sensors associate with farther away sections are spaced more closely spaced than are sensors associated with closer sections.

3. The receiving unit of claim 1, wherein each sensor has a distance from said lens that is determined by its distance from its associated section.

4. The receiving unit of claim 3, wherein sensors associated with farther away sections are farther from said lens than are sensors associated with closer sections.

5. The receiving unit of claim 1, wherein said lens is made from a plastic material.

6. The receiving unit of claim 1, and further comprising an electrical connection from each sensor for providing an electrical signal representing the detection of light above a certain intensity.

7. The receiving unit of claim 1, wherein each of said sensors is an optical receiver, and further comprising an optical connection from each sensor for providing an optical output signal.

8. The receiving unit of claim 1, wherein said sensors are arranged in a pattern of nearly concentric rings, corresponding to rings of sections of a square location area.

9. The receiving unit of claim 1, and further comprising a housing for said sensors comprising a base and a connector associated with each of said sensors extending from said base to a point nearly touching said sensor.

10. The receiving unit of claim 7, wherein said connectors are optical connectors.

11. The receiving unit of claim 7, wherein said connectors are electrical connectors.

12. The receiving unit of claim 1, wherein each of said sensors is at a predetermined distance behind said lens such that each sensor receives substantially the same intensity of light if said target is located in the section corresponding to that sensor.

13. The receiving unit of claim 1, wherein said sensors are optical receivers.

14. A method of making an optical receiver for locating a target in a defined area divided into sections, comprising the steps of:
  selecting a lens in the general shape of a sphere and having known refractive properties for receiving light from all sections of the area at its front side;
  locating a number of sensors behind said lens, such that there is a one to one correspondence between sections of said area and said sensors; and
  using ray tracing techniques to space said sensors from each other, with variable spacing, such that each sensor receives light from a maximum area of its section with a minimum of light from other sections.

15. The method of claim 14, and further comprising the step of placing said sensors at distances behind said lens such that each senor receives a signal of approximately equal intensity if the target is located in the section associated with that sensor.

16. The method of claim 14, wherein all sections of the area have the same size, and further comprising the step of spacing said sensors with respect to each other such that sensors corresponding to farther away sections are more closely spaced than sensors corresponding to closer sections.

17. The method of claim 14, wherein said ray tracing step comprises tracing rays from multiple points in each section to determine an area of overlapping convergence cones in which said sensor is located.

18. The method of claim 14, wherein said step of using ray tracing is performed with a computer.

19. An optical location system for locating a light emitting target in a defined area, comprising:
  an optical transmitter for attachment to a target object to be located;
  an optical receiver having a lens in the general shape of a sphere made from a transparent material, having a front side for receiving light from an area in which a target is to be located and a back side for emanating said light to a number of sensors, and having number of point sensors spaced from said back side of said lens, wherein the number of sensors corresponds to the number of sections of said area, and wherein said sensors are arranged behind said lens with variable spacing between them such that each sensor has a position relative to other sensors and a distance from said lens that is determined by its distance from its corresponding section; and
  a processor means for matching the output of said sensors to a section of the location area.

20. An optical receiving unit for an optical location system, which locates a radiation-emitting target in a defined area divided into sections, comprising:
  a lens in the general shape of a sphere having a front side for receiving radiation and a back side for emanating said radiation to a number of sensors; and
  a number of sensors spaced from said back side of said lens wherein each sensor is associated with at least one section of said area; and
  wherein said sensors are arranged behind said lens in a predetermined pattern, with each sensor having a height above said lens and a size that is determined by the distance of that sensor from its associated section.

21. The optical receiving unit of claim 20, wherein each sensor has a height and size such that each sensor receives approximately the same intensity of light from a target in its associated section as does any other of said sensors.

22. The optical receiving unit of claim 20, wherein each sensor has spacing from its neighboring sensors that varies from that of other of said sensors.

* * * * *